(12) United States Patent
Kim et al.

(10) Patent No.: US 10,611,249 B2
(45) Date of Patent: Apr. 7, 2020

(54) BATTERY MODULE, BATTERY PACK COMPRISING BATTERY MODULE, AND VEHICLE COMPRISING BATTERY PACK

(71) Applicant: LG CHEM, LTD., Seoul (KR)

(72) Inventors: Tae-Geun Kim, Daejeon (KR); Jin-Woo Park, Daejeon (KR); Bok-Gun Lee, Daejeon (KR); Jeong-Woon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 162 days.

(21) Appl. No.: 15/744,443

(22) PCT Filed: Jan. 24, 2017

(86) PCT No.: PCT/KR2017/000826
§ 371 (c)(1),
(2) Date: Jan. 12, 2018

(87) PCT Pub. No.: WO2017/150807
PCT Pub. Date: Sep. 8, 2017

(65) Prior Publication Data
US 2018/0194235 A1    Jul. 12, 2018

(30) Foreign Application Priority Data
Mar. 3, 2016    (KR) .................. 10-2016-0025747

(51) Int. Cl.
*B60L 9/00*    (2019.01)
*B60L 11/18*    (2006.01)
(Continued)

(52) U.S. Cl.
CPC ............... *B60L 11/18* (2013.01); *B60L 50/50* (2019.02); *H01M 2/10* (2013.01); *H01M 2/1077* (2013.01);
(Continued)

(58) Field of Classification Search
CPC .......... B60L 11/18; B60L 50/50; H01M 2/20; H01M 2/10; H01M 2/206; H01M 2/1077; H01M 2220/20; H01M 10/425; H01M 10/482
USPC .......... 701/22; 429/120, 161, 176, 162, 211, 429/158, 219, 90, 62; 180/65.1
See application file for complete search history.

(56) References Cited

U.S. PATENT DOCUMENTS

| | | | |
|---|---|---|---|
| 9,005,794 B2* | 4/2015 | Zhao | H01M 2/26 429/121 |
| 2013/0216878 A1* | 8/2013 | Merriman | H01M 2/206 429/92 |

(Continued)

FOREIGN PATENT DOCUMENTS

| | | |
|---|---|---|
| EP | 2 693 516 A1 | 2/2014 |
| JP | 2007-109548 A | 4/2007 |

(Continued)

OTHER PUBLICATIONS

International Search Report issued in PCT/KR2017/000826 (PCT/ISA210), dated Apr. 27, 2017.

*Primary Examiner* — Shardul D Patel
(74) *Attorney, Agent, or Firm* — Birch, Stewart, Kolasch & Birch, LLP

(57) ABSTRACT

Disclosed is a battery module, which includes a plurality of battery cells stacked on one another and respectively having electrode leads protruding on at least one side thereof, and a bus bar assembly configured to electrically connect the electrode leads of the plurality of battery cells and having at least one lead slot through which electrode leads of two battery cells adjacent to each other pass in common.

11 Claims, 9 Drawing Sheets

(51) Int. Cl.
  *H01M 2/10* (2006.01)
  *H01M 2/20* (2006.01)
  *B60L 50/50* (2019.01)
  *H01M 10/42* (2006.01)
  *H01M 10/48* (2006.01)

(52) U.S. Cl.
  CPC ............ *H01M 2/20* (2013.01); *H01M 2/206* (2013.01); *H01M 10/425* (2013.01); *H01M 10/482* (2013.01); *H01M 2220/20* (2013.01)

(56) References Cited

U.S. PATENT DOCUMENTS

| | | | |
|---|---|---|---|
| 2014/0023909 A1* | 1/2014 | Suzuki ................ | H01M 2/206 429/158 |
| 2015/0180095 A1* | 6/2015 | Chen ................... | H01M 2/0285 429/120 |
| 2015/0263394 A1* | 9/2015 | Yoshioka ............ | H01M 2/1077 429/90 |
| 2015/0349373 A1* | 12/2015 | Snyder ................ | H01M 10/02 429/162 |

FOREIGN PATENT DOCUMENTS

| | | |
|---|---|---|
| KR | 10-2014-0056835 A | 5/2014 |
| KR | 10-2014-0062171 A | 5/2014 |
| KR | 10-2014-0093424 A | 7/2014 |
| KR | 10-2014-0137044 A | 12/2014 |
| KR | 10-2014-0144941 A | 12/2014 |

* cited by examiner

BATTERY MODULE, BATTERY PACK COMPRISING BATTERY MODULE, AND VEHICLE COMPRISING BATTERY PACK

TECHNICAL FIELD

The present disclosure relates to a battery module, a battery pack including the battery module, and a vehicle including the battery pack.

The present application claims priority to Korean Patent Application No. 10-2016-0025747 filed on Mar. 3, 2016 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module includes a plurality of stacked battery cells and a bus bar assembly for electrically connecting electrode leads of the plurality of battery cells.

Here, the bus bar assembly includes a bus bar frame having lead slots through which the electrode leads of the battery cells pass individually, and a bus bar mounted to the bus bar frame and having bus bar slots corresponding to the number of lead slots, so that the bus bar is connected to the electrode leads passing through the bus bar slots by welding or the like.

However, in the conventional battery module, since the lead slots are required as much as the number of the electrode cells, the number of lead slots is increased according to the number of the electrode leads. Also, as the number of lead slots is increased, intervals of the lead slots are relatively narrowed at the bus bar frame, which may deteriorate the efficiency of the assembling process, for example by increasing the probability of assembly failure such as misassembling according to the number of electrode leads.

Therefore, in the battery module, it is required to find a way to improve the efficiency of the assembly process when the bus bar assembly is assembled to the battery cell.

DISCLOSURE

Technical Problem

The present disclosure is directed to providing a battery module which may improve the efficiency of the assembling process when a bus bar assembly is assembled to a battery cell, a battery pack including the battery module, and a vehicle including the battery pack.

Technical Solution

In one aspect of the present disclosure, there is provided a battery module, comprising: a plurality of battery cells stacked on one another and respectively having electrode leads protruding on at least one side thereof; and a bus bar assembly configured to electrically connect the electrode leads of the plurality of battery cells and having at least one lead slot through which electrode leads of two battery cells adjacent to each other pass in common.

The bus bar assembly may include: a bus bar frame configured to cover the plurality of battery cells and having the at least one lead slot; and at least one bus bar mounted to one side of the bus bar frame and connected to the electrode leads which pass through the at least one lead slot in common.

The bus bar frame may include at least one pass guider provided at the other side of the bus bar frame to guide the electrode leads of the adjacent two battery cells to pass through the at least one lead slot.

The at least one pass guider may include: a first guider formed at the other side of the bus bar frame to guide the electrode lead of any one of the adjacent two battery cells to pass through the at least one lead slot; and a second guider disposed to be spaced apart from the first guider with the at least one lead slot being interposed therebetween to guide the electrode lead of the other of the adjacent two battery cells to pass through the at least one lead slot.

A width between the first guider and the second guider may become smaller as being closer to the at least one lead slot.

At least one of the first guider and the second guider may be inclined toward the at least one lead slot.

The at least one pass guider may be provided in a number corresponding to the number of the at least one lead slot.

Two electrode leads passing through the at least one lead slot in common may be bent in the same direction to come into contact with each other.

Two electrode leads passing through the at least one lead slot in common may be bent integrally.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module which may improve the efficiency of the assembling process when a bus bar assembly is assembled to a battery cell, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
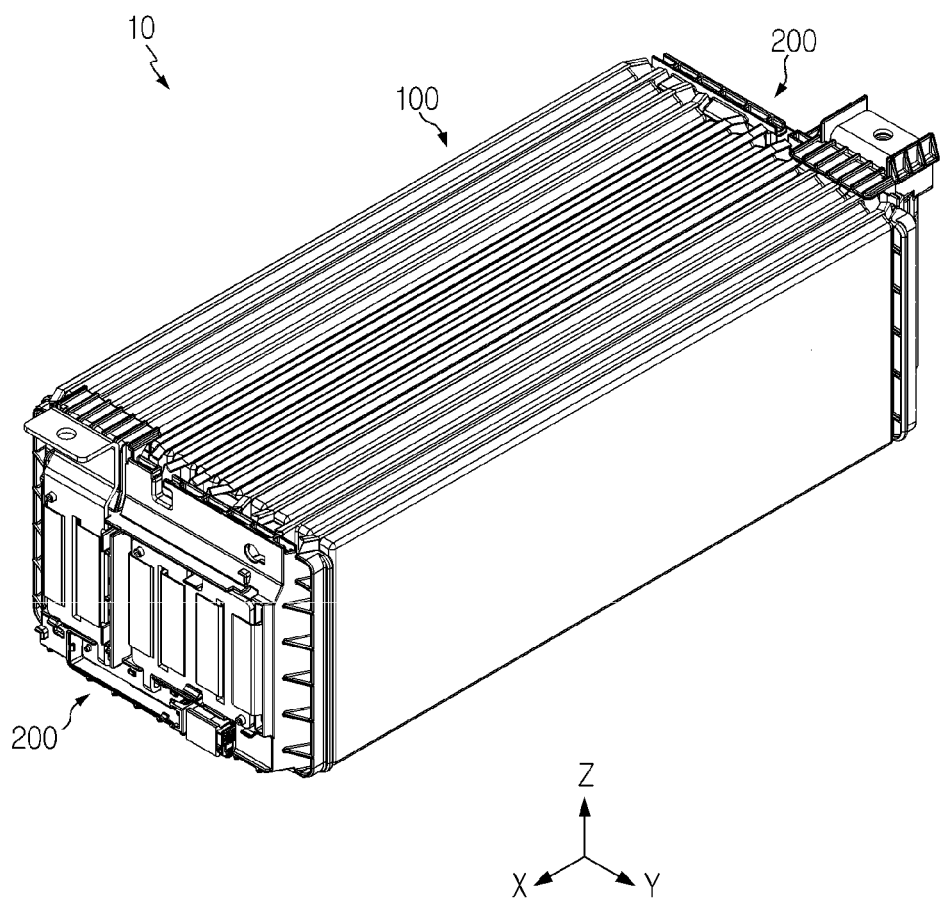
FIG. 1 is a diagram for illustrating a battery module according to an embodiment of the present disclosure.
Figure 2:
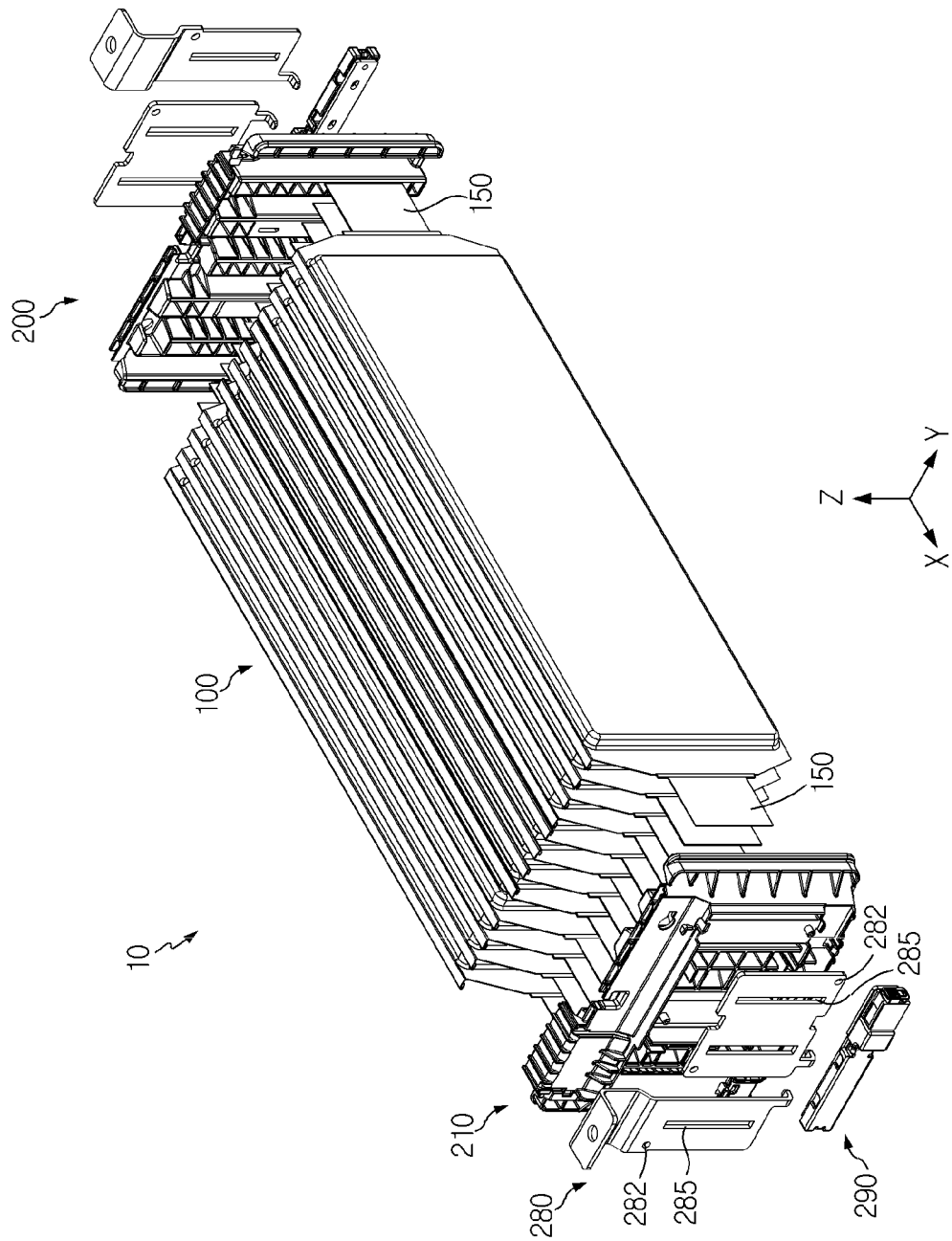
FIG. 2 is an exploded perspective view showing the battery module of FIG. 1.
Figure 3:
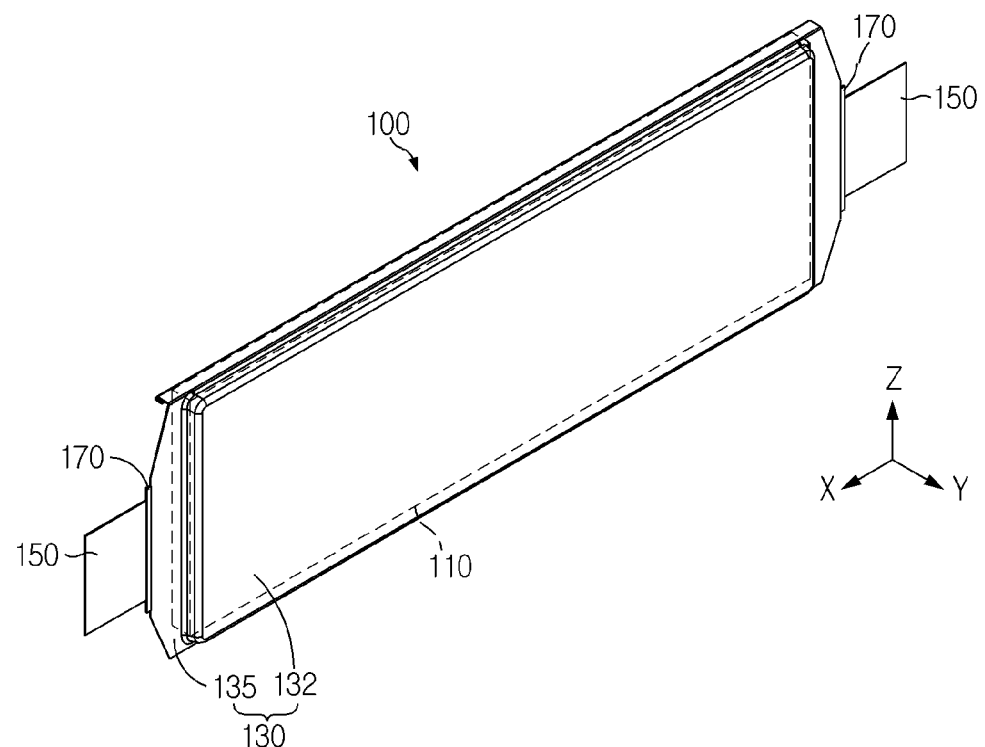
FIG. 3 is a perspective view showing a battery cell of the battery module of FIG. 2.
Figure 4:
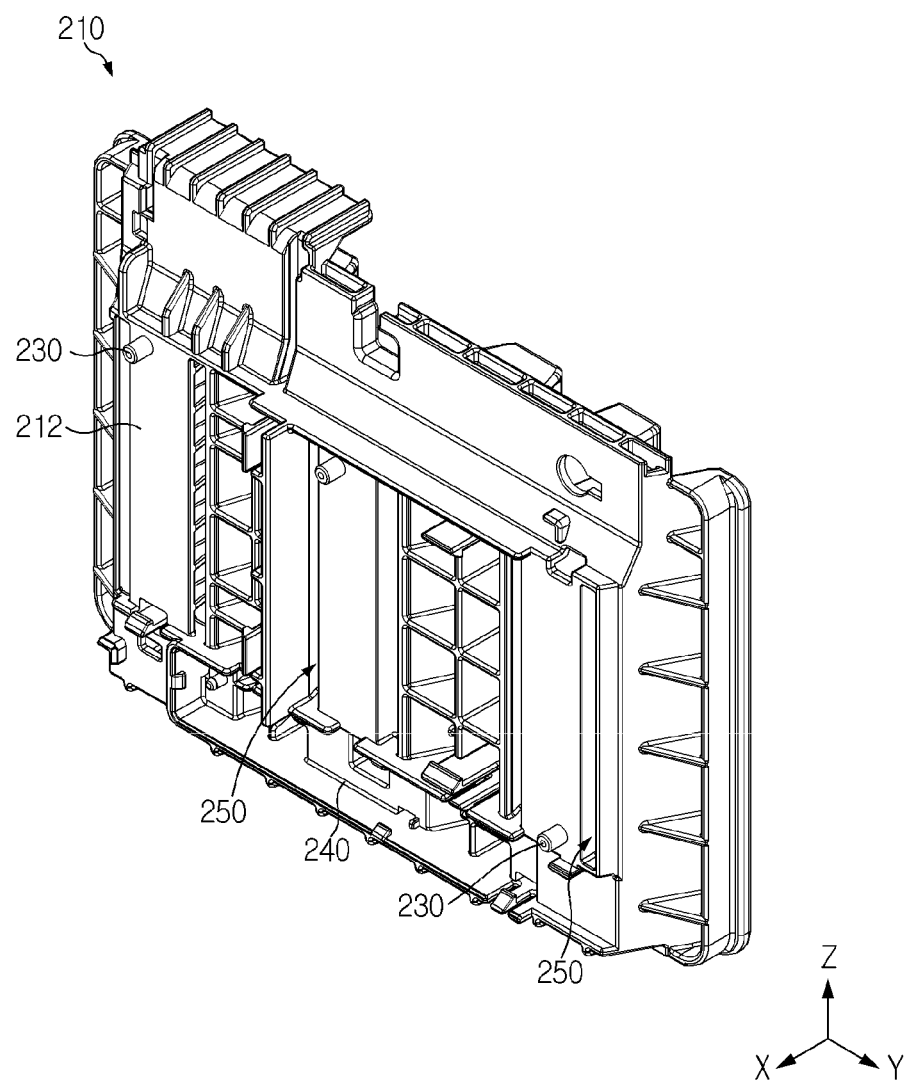
FIG. 4 is a perspective view showing a bus bar frame of a bus bar assembly, employed at the battery module of FIG. 2.
Figure 5:
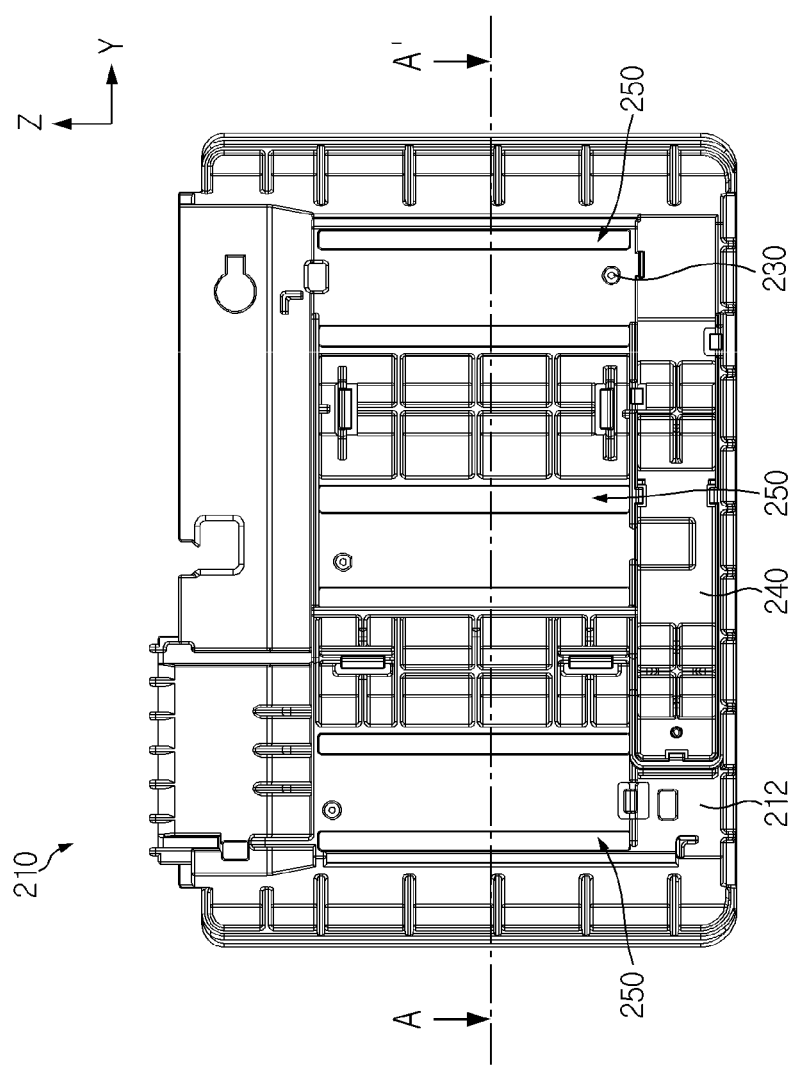
FIG. 5 is a front view showing the bus bar frame of FIG. 4.
Figure 6:
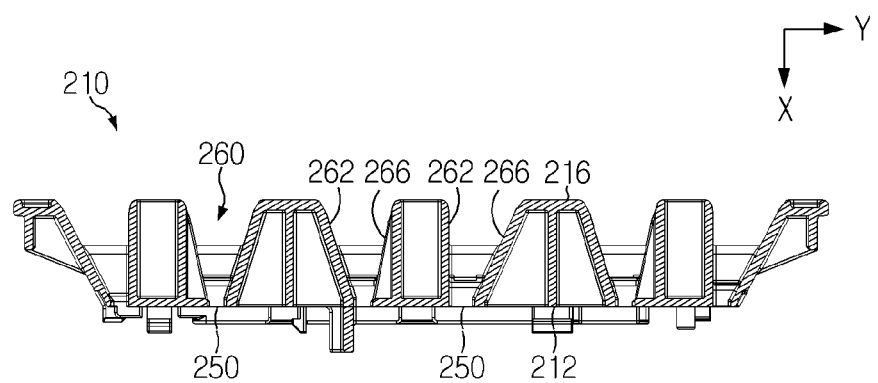
FIG. 6 is a cross-sectioned view, taken along the line A-A' of FIG. 5.

FIG. 1 is a diagram for illustrating a battery module according to an embodiment of the present disclosure, FIG. 2 is an exploded perspective view showing the battery module of FIG. 1, FIG. 3 is a perspective view showing a battery cell of the battery module of FIG. 2, FIG. 4 is a perspective view showing a bus bar frame of a bus bar assembly, employed at the battery module of FIG. 2, FIG. 5 is a front view showing the bus bar frame of FIG. 4, and FIG. 6 is a cross-sectioned view, taken along the line A-A' of FIG. 5.

Referring to FIGS. 1 to 6, a battery module 10 may include a battery cell 100 and a bus bar assembly 200.

The battery cell 100 is a secondary battery, and may be a pouch-type secondary battery. The battery cell 100 may be provided in plural, and the plurality of battery cells 100 may be stacked on one another so as to be electrically connected to each other.

Each of the plurality of battery cells 100 may include an electrode assembly 110, a battery case 130, an electrode lead 150 and an insulating tape 170.

The electrode assembly 110 may include a positive electrode plate, a negative electrode plate and a separator. The electrode assembly 110 is well known in the art and not described in detail here.

The battery case 130 is used for packaging the electrode assembly 110, and may be made of a laminate sheet including a resin layer and a metal layer. The battery case 130 may include a case body 132 and a case terrace 135.

The case body 132 may accommodate the electrode assembly 110. For this, the case body 132 may have an accommodation space capable of accommodating the electrode assembly 110.

The case terrace 135 extends from the case body 132 and may be sealed to keep the electrode assembly 110 airtight. At one side of the case terrace 135, specifically at a front portion (+X-axial direction) and a rear portion (−X-axial direction) of the case terrace 135, the electrode lead 150, explained later, may be partially exposed.

The electrode lead 150 may be electrically connected to the electrode assembly 110. The electrode lead 150 may be provided in a pair. A portion of the pair of electrode leads 150 may protrude out of the case terrace 135 at a front portion (+X-axial direction) and a rear portion (−X-axial direction) of the battery case 130, respectively.

The insulating tape 170 may prevent a short circuit between the battery case 130 and the electrode lead 150 and improve the sealing performance of the case terrace 135.

The insulating tape 170 may be provided in a number corresponding to the number of the electrode leads 150. Accordingly, the insulating tape 170 may be provided in a pair. A portion of the pair of insulating tapes 170 may protrude out of the case terrace 135 at a front portion (+X-axial direction) and a rear portion (−X-axial direction) of the battery case 130, respectively.

The bus bar assembly 200 is used for electrically connecting the electrode leads 150 of the plurality of battery cells 100 and may cover the plurality of battery cells 100 so as to be electrically connected to the plurality of battery cells 100.

This bus bar assembly 200 may cover the plurality of battery cells 100 in a protruding direction (X-axial direction) of the electrode leads 150 of the plurality of battery cells 100.

For this, the bus bar assembly 200 may be provided in a pair. The pair of bus bar assemblies 200 may cover the plurality of battery cells 100 so that the electrode leads 150 protruding at a front portion (+X-axial direction) of the plurality of battery cells 100 and the electrode leads 150 protruding at a rear portion (−X-axial direction) of the plurality of battery cells 100 are electrically connected.

The pair of bus bar assemblies 200 may include a bus bar frame 210, a bus bar 280, and an ICB board 290, respectively.

The bus bar frame 210 may cover the front portion (+X-axial direction) or the rear portion (−X-axial direction) of the plurality of battery cells 100. For this, the bus bar frame 210 may have an area corresponding to the front portion (+X-axial direction) or the rear portion (−X-axial direction) of the plurality of battery cells 100.

The bus bar frame 210 may include a bus bar mounting protrusion 230, a board mounting portion 240, a lead slot 250 and a pass guider 260.

The bus bar mounting protrusion 230 is used for mounting a bus bar 280, explained later, and may be provided at one side of the bus bar frame 210, specifically at a front surface 212 of the bus bar frame 210.

The board mounting portion 240 is used for mounting the ICB board 290 and may be provided at the front surface 212 of the bus bar frame 210 and form a predetermined accommodation space for accommodating the ICB board 290.

The lead slot 250 is used for allowing the electrode leads 150 of the plurality of battery cells 100 to pass therethrough and may be formed along a vertical direction (Z-axial direction) of the bus bar frame 210.

This lead slot 250 may allow electrode leads 150 of adjacent two battery cells 100 to pass therethrough in common. In other words, one lead slot 250 may allow the electrode leads 150 of adjacent two battery cells 100 to pass therethrough in common. That is, in this embodiment, the electrode leads 150 of two facing battery cells 100 may pass through a single lead slot 250 in common.

The lead slot 250 may be provided in plural, and the plurality of lead slots 250 may be spaced apart from each other by a predetermined distance along a lateral direction (Y-axial direction) of the bus bar frame 210.

The number of lead slots 250 may be provided in half of the number of the battery cells 100. This is because each lead slot 250 of this embodiment allows the electrode leads 150 of adjacent two battery cells 100 to pass therethrough in common.

Accordingly, in this embodiment, the number of lead slots, which have been conventionally prepared corresponding to the number of battery cells, may be reduced by half, and thus it is easy to manufacture the lead slots 250 in the bus bar frame 210 and the width the lead slots 250 may be relatively broadened.

The pass guider 260 is used for guiding the electrode leads 150 of the adjacent two battery cells 100 to pass through the lead slot 250 and may be provided at the other side of the bus bar frame 210, specifically at a rear surface 216 of the bus bar frame 210.

The pass guider 260 may form a predetermined guide space in the rear surface 216 of the bus bar frame 210 so that the two electrode leads 150 may come close to each other before passing through the lead slot 250. For this, the width of the guide space may become narrower from the rear portion (−X-axial direction) of the bus bar frame 210 toward the front portion (+X-axial direction) of the bus bar frame 210 having the lead slot 250.

The pass guider 260 may be provided in plural. Here, the plurality of pass guiders 260 may be provided corresponding to the number of the plurality of lead slots 250. Accordingly, the electrode leads 150 of adjacent two battery cells among the plurality of battery cells 100 may form pairs and then pass through the corresponding lead slot 250 after passing through the pass guider 260.

The plurality of pass guiders 260 may include a first guider 262 and a second guider 266, respectively.

The first guider 262 is formed at the other side 216 of the bus bar frame 210, namely at the rear surface 216 of the bus bar frame 210 and may guide the electrode lead 150 of any one of the adjacent two battery cells 100 to pass through the lead slot 250.

The second guider 266 may be spaced apart from the first guider 262 with the lead slot 250 being interposed therebetween and guide the electrode lead 150 of the other of the adjacent two battery cells 100 to pass through the lead slot 250.

The width between the second guider 266 and the first guider 262 may be gradually reduced as being closer to the lead slot 250 so that the electrode leads 150 of the adjacent two battery cells 100 forming a pair may easily pass through the lead slot 250. For this, at least one of the second guider 266 and the first guider 262 may be inclined toward the lead slot 250.

The bus bar 280 is mounted to one side of the bus bar frame 210, specifically to the front surface 212 of the bus bar frame 210 and may be connected to the electrode leads 150 which pass through the plurality of lead slots 250 in common.

The bus bar 280 may be provided in a pair. The pair of bus bars 280 may include a frame mounting groove 282 and a bus bar slot 285, respectively.

The bus bar mounting protrusion 230 of the bus bar frame 210 may be inserted into the frame mounting groove 282 when the bus bar frame 210 of the bus bar 280 is mounted.

The bus bar slot 285 may allow at least a portion of the electrode leads 150, which pass through the lead slots 250, to pass a front portion (+X-axial direction) of the bus bar 280. In this embodiment, two electrode leads 150 passing through the lead slots 250 in common may be bent after passing through the bus bar slot 285, or be bent at both ends (Y-axial direction) of the bus bar 280 and connected to the bus bar 280 by welding or the like.

In this embodiment, since portions of two electrode leads 150 passing through the lead slots 250 at both ends (Y-axial direction) of the bus bar 280 and connected to the bus bar 280, the number of the bus bar slots 285 need not correspond to the number of the lead slots 250.

Accordingly, in this embodiment, it is possible to secure more area for the bus bar 280, and thus a cross-sectional area of the bus bar 280 through which current flows may be increased. Thus, in this embodiment, when current flows through the bus bar 280, the resistance of the bus bar 280 may be minimized, thereby effectively preventing the bus bar 280 from overheating.

Hereinafter, a process of assembling the battery module 100 and the bus bar assembly 200 of the battery module 10 according to this embodiment will be described in more detail.

Figure 7:
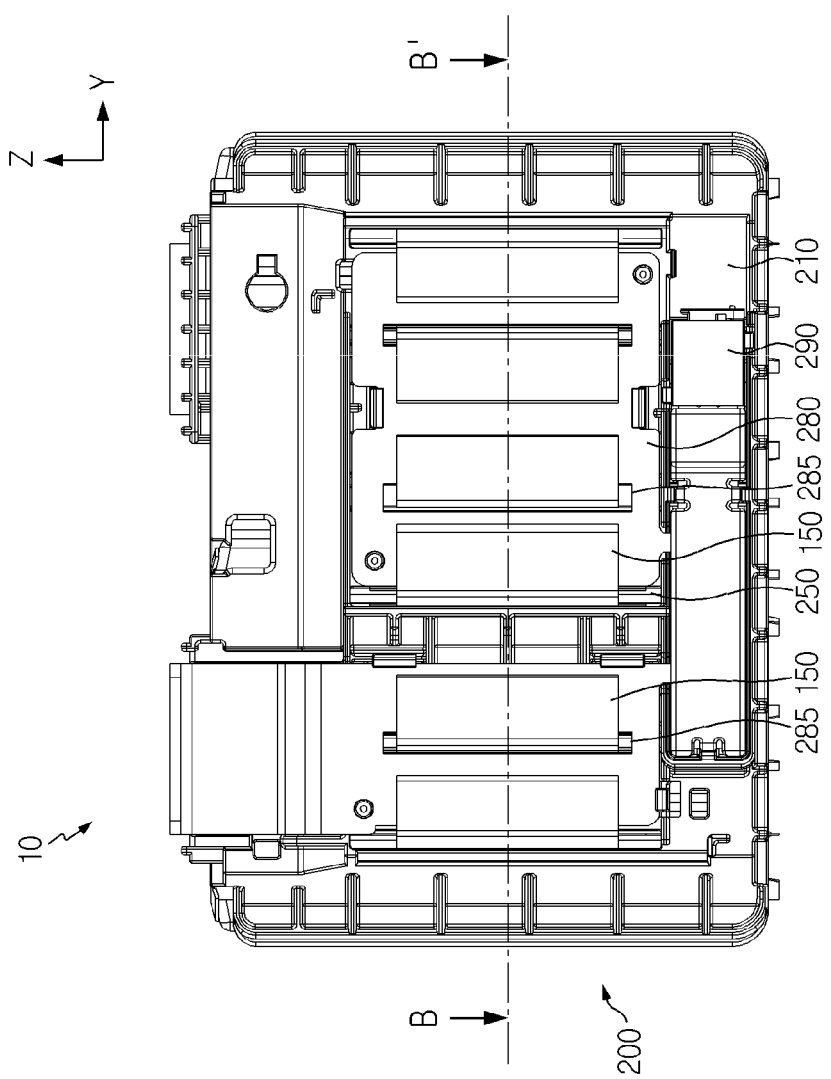
FIG. 7 is a front view showing the battery module of FIG. 1.
Figure 8:
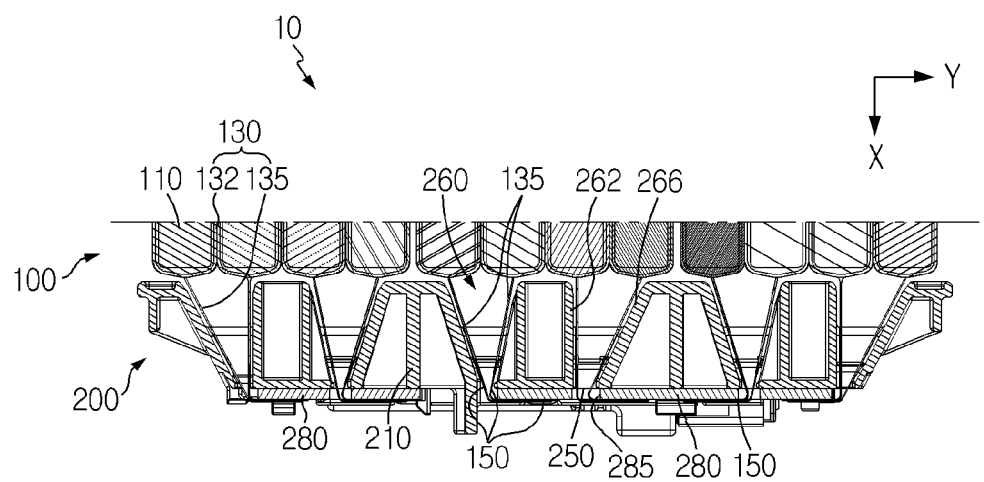
FIG. 8 is a cross-sectioned view, taken along the line B-B' of FIG. 7.

FIG. 7 is a front view showing the battery module of FIG. 1, and FIG. 8 is a cross-sectioned view, taken along the line B-B' of FIG. 7.

Referring to FIGS. 7 and 8, the plurality of battery cells 100 may be assembled with the pair of bus bar assemblies 200 for mutual electrical connection and voltage sensing. For convenience of explanation, hereinafter, the process of assembling the plurality of battery cells 100 and the bus bar assembly 200 at a front portion (+X-axial direction) of the plurality of battery cells 100 will be described.

Here, the electrode leads 150 of adjacent two battery cells 100 among the plurality of battery cells 100 may pass through the lead slot 250 provided in a front portion (+X-axial direction) thereof in common. Accordingly, the battery module 10 of this embodiment may enhance the efficiency of the assembling process for the plurality of battery cells 100 and the bus bar assembly 200.

At this time, first, in order to help the electrode leads 150 to pass through the lead slot 250 easily, the case terraces 135 of the adjacent two battery cells 100 and the electrode leads 150 protruding from the case terraces 135 may be all guided by the pass guider 260 to slide to a font portion (+X-axial direction) of the bus bar frame 210.

After that, the case terraces 135 and the electrode leads 150 of the adjacent two battery cells 100 may be guided by the first guider 262 and the second guider 266, respectively, to come closer to each other as moving to the front portion (+X-axial direction) of the bus bar frame 210.

In this embodiment, not only the electrode leads 150 of the adjacent two battery cells 100 moving closer by the pass guider 260 but also the case terraces 135 of the adjacent two battery cells 100 may be guided at a rear portion (-X-axial direction) of the bus bar frame 210.

Accordingly, in this embodiment, the electrode leads 150 may more easily pass through to the lead slot 250 just by sliding the case terraces 135 from a rear portion (-X-axial direction) of the bus bar frame 210 to the pass guider 260.

After that, two electrode leads 150 passing through the lead slot 250 in common may be bent after passing through the bus bar slot 285 of the bus bar 280 or bent at both ends (Y-axial direction) of the bus bar 280 and then connected to the bus bar 280.

At this time, two electrode leads 150 passing through the lead slot 250 in common may be bent in the same direction and then connected to the bus bar 280 by welding or the like. In other words, two electrode leads 150 passing through the lead slot 250 in common may be integrally bent together in the same direction and connected to the bus bar 280 by welding or the like.

Accordingly, in this embodiment, the electrode leads 150 may be bent fewer times, which may improve the efficiency of the assembling process further. In addition, in this embodiment, since the ends of two electrode leads 150 passing through the lead slot 250 in common are bent in the same direction, both ends of two electrode leads 150 may be exposed to the outside. Thus, in this embodiment, the welding quality of the electrode leads 150 may be further improved since the welding condition of the two electrode leads 150 may be entirely checked during the welding process.

As described above, the battery module 10 of this embodiment may greatly improve the efficiency of the assembling process when the plurality of battery cells 100 and the bus bar assembly 200 are assembled.

Figure 9:
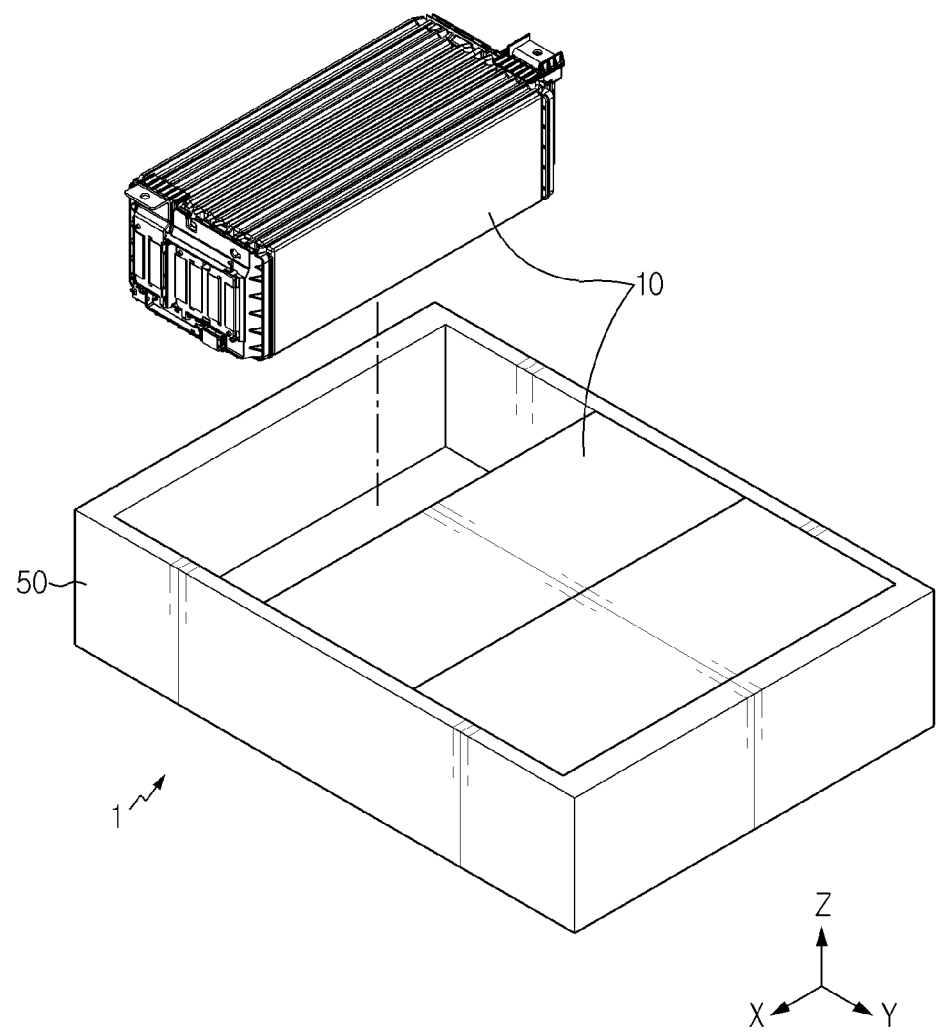
FIG. 9 is a diagram for illustrating a battery pack according to an embodiment of the present disclosure.

FIG. 9 is a diagram for illustrating a battery pack according to an embodiment of the present disclosure.

Referring to FIG. 9, a battery pack 1 may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a plurality of battery cells stacked on one another and respectively having electrode leads protruding on at least one side thereof;
a bus bar assembly configured to electrically connect the electrode leads of the plurality of battery cells and having at least one lead slot through which electrode leads of two battery cells adjacent to each other pass in common;
a bus bar frame configured to cover the plurality of battery cells and having the at least one lead slot;
at least one bus bar mounted to a first side of the bus bar frame and connected to the electrode leads which pass through the at least one lead slot in common; and
at least one pass guider provided at a second side of the bus bar frame to guide the electrode leads of the adjacent two battery cells to pass through the at least one lead slot.

2. The battery module according to claim 1, wherein the at least one pass guider includes:
a first guider formed at the other side of the bus bar frame to guide the electrode lead of any one of the adjacent two battery cells to pass through the at least one lead slot; and
a second guider disposed to be spaced apart from the first guider with the at least one lead slot being interposed therebetween to guide the electrode lead of the other of the adjacent two battery cells to pass through the at least one lead slot.

3. The battery module according to claim 2, wherein a width between the first guider and the second guider becomes smaller as being closer to the at least one lead slot.

4. The battery module according to claim 3, wherein at least one of the first guider and the second guider is inclined toward the at least one lead slot.

5. The battery module according to claim 1, wherein the at least one pass guider is provided in a number corresponding to the number of the at least one lead slot.

6. The battery module according to claim 1, wherein two electrode leads passing through the at least one lead slot in common are bent in the same direction to come into contact with each other.

7. The battery module according to claim 6, wherein two electrode leads passing through the at least one lead slot in common are bent integrally.

8. A battery pack, comprising:
at least one battery module defined in claim 1; and
a pack case configured to package the at least one battery module.

9. A vehicle, comprising at least one battery pack defined in claim 8.

10. The battery module according to claim 1, wherein the at least one pass guider comprises two surfaces converging toward each other, the at least one lead slot being between the two surfaces.

11. The battery module according to claim 1, wherein the at least one pass guider extends from the second side of the bus bar frame toward the plurality of battery cells.

\* \* \* \* \*